March 7, 1933.  J. A. BALL  1,900,034
COLOR CINEMATOGRAPHIC APPARATUS
Filed Oct. 15, 1929
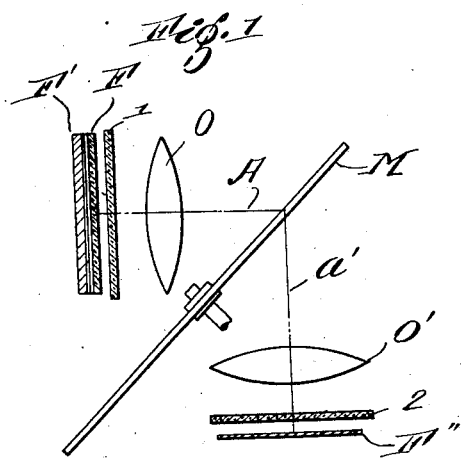
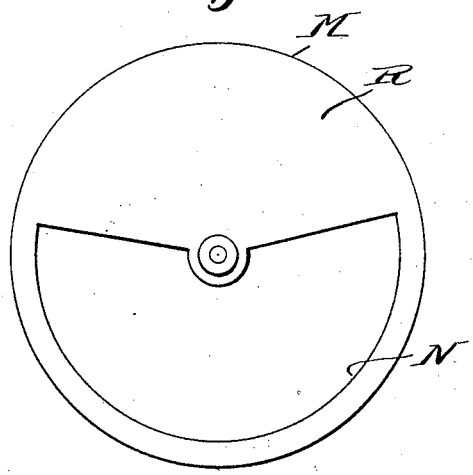
Inventor
Joseph A. Ball
By Roberts, Cushman & Woodbury
his Attorneys Patented Mar. 7, 1933

1,900,034

UNITED STATES PATENT OFFICE

JOSEPH A. BALL, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

COLOR CINEMATOGRAPHIC APPARATUS

Application filed October 15, 1929. Serial No. 399,742.

This invention relates to cinematography in colors and to an apparatus for recording different color aspects in complemental records for subtractive projection.

In color cinematography objectionable color fringes are often caused by failure of records of different color aspects to correspond precisely. While heretofore it has been possible to produce records of different color aspects simultaneously and/or along the same optical path the means proposed for this purpose have in general been found to be unsatisfactory. For instance the use of more than one light-dividing surface or partial reflector results in a serious loss of light for the second and third color records; while the use of a single film with three images of each complemental set distributed longitudinally of the film is impractical because of the excessive speed required to advance the film three picture spaces between each set of exposures; and of course records made from different sources or along different optical paths will not be complementary.

Objects of the present invention are to improve the art of making records for subtractive projection and to provide an apparatus for producing three or more complemental records which may be reproduced in superposition without noticeable color fringes.

In the drawing;

Fig. 1 is a diagrammatic view in side elevation, with parts in section, of an optical system; and Fig. 2 is an end elevation of the reflecting shutter in Fig. 1.

The embodiment of this invention which has been selected for illustration comprises an objective lens O, which is interposed in the path of the main beam of light along optical axis A; a filter 1 disposed between the lens O and a bi-pack comprising films F and F' arranged with their emulsion sides adjacent; a revolving shutter M having an opening N for transmitting light along the optical axis A during approximately one-half revolution (more or less) and a reflecting surface R for reflecting light during the remainder of each revolution along path $a'$, another objective lens O' and a second filter 2, whereby film at F, F' and F'' may be exposed with light of three different colors or characteristic hues, for example red, green and blue.

With some colors, as with blue for example, a relatively slight overlapping or failure to correspond is not noticeable while with other colors, such as green and red, the same degree of overlapping produces distinct and therefore objectionable color fringes. By exposing the film at F and F' to the red and green components of light, the red and green records will register exactly inasmuch as they are exposed simultaneously along the same path; and by exposing the film F'' to the blue component, the tendency to color fringing due to the fact that this exposure is not simultaneous with the other two will not be noticeable for the reason that the blue record, which is colored yellow in the final picture, does not contribute largely to the definition of the picture. While the colors red, green and blue have been referred to for the purpose of illustration, it will of course be understood that other combinations of colors may be employed as for example red-orange, blue-green and blue-violet.

From the foregoing it will be apparent that by virtue of the arrangement of bi-pack in position to receive light along the optical axis A, pairs of records representing two-color aspects are formed on films F and F' from the same point of view along the same optical path and that the third series of records is formed at F'' representing a different color aspect, the exposures at F'' alternating with those at F and F'. Obviously when using apparatus for exposing cinematographic film, the film may be advanced intermittently with any suitable mechanism and while auxiliary shutters may be used in the different paths if desired, the reflecting shutter M may be used alone, in which case the film F'' is advanced while the films F and F' are being exposed and vice versa.

This subject-matter is claimed generically in my copending Patent 1,873,259 granted August 23, 1932.

I claim:

1. Apparatus for making three-color cinematographic pictures comprising means for simultaneously exposing, from the same point of view and along the same optical path, parallel juxtaposed records of series of complemental images representing two color aspects, means for shuttering light along said path between successive exposures, and means for exposing, during the intervals when said path is shuttered, records of a third series representing a different color aspect.

2. Apparatus for making three-color cinematographic pictures comprising means for simultaneously exposing, from the same point of view and along the same optical path, parallel juxtaposed records of series of complemental images representing red and green aspects, means for shuttering light along said path between successive exposures, and means for exposing, during the intervals when said path is shuttered records of a third series representing a blue aspect.

3. Apparatus for making three-color cinematographic film comprising means for simultaneously exposing, from the same point of view along the same path, parallel juxtaposed records of series of complemental images representing two color aspects, a movable reflector for deflecting light from said path between successive exposures, and means in the path of the deflected light for exposing, during the intervals when said first path is shuttered by said reflector, records of a third series representing a different color aspect.

Signed by me at Boston, Massachusetts, this 11th day of October, 1929.

JOSEPH A. BALL.